(12) United States Patent
Alkalay et al.

(10) Patent No.: US 10,871,991 B2
(45) Date of Patent: Dec. 22, 2020

(54) MULTI-CORE PROCESSOR IN STORAGE SYSTEM EXECUTING DEDICATED POLLING THREAD FOR INCREASED CORE AVAILABILITY

(71) Applicant: EMC IP Holding Company LLC, Hopkinton, MA (US)

(72) Inventors: Amitai Alkalay, Kadima (IL); Lior Kamran, Rishon LeZion (IL); Eldad Zinger, Ra'anana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 83 days.

(21) Appl. No.: 16/251,779

(22) Filed: Jan. 18, 2019

(65) Prior Publication Data

US 2020/0233704 A1    Jul. 23, 2020

(51) Int. Cl.
*G06F 9/48* (2006.01)
*G06F 3/06* (2006.01)

(52) U.S. Cl.
CPC ............ *G06F 9/4881* (2013.01); *G06F 3/061* (2013.01); *G06F 3/0656* (2013.01); *G06F 3/0683* (2013.01)

(58) Field of Classification Search
CPC .............................. G06F 9/4881; G06F 3/061
USPC ...................................................... 718/1–108
See application file for complete search history.

(56) References Cited

U.S. PATENT DOCUMENTS

| | | |
|---|---|---|
| 7,444,464 B2 | 10/2008 | Urmston et al. |
| 8,095,726 B1 | 1/2012 | O'Connell et al. |
| 8,214,612 B1 | 7/2012 | Natanzon |
| 8,271,986 B2 * | 9/2012 | Jiang .......................... G06F 9/52 718/104 |
| 9,104,326 B2 * | 8/2015 | Frank ....................... G06F 3/061 |
| 9,208,162 B1 | 12/2015 | Hallak et al. |
| 9,286,003 B1 | 3/2016 | Hallak et al. |
| 9,552,258 B2 | 1/2017 | Hallak et al. |
| 9,606,870 B1 | 3/2017 | Meiri et al. |

(Continued)

FOREIGN PATENT DOCUMENTS

WO    2016111954 A1    7/2016

OTHER PUBLICATIONS

Blake, Geoffrey, Ronald G. Dreslinski, and Trevor Mudge. "A survey of multicore processors." IEEE Signal Processing Magazine 26.6 (2009): pp. 26-37. (Year: 2009).*

(Continued)

*Primary Examiner* — Satish Rampuria
(74) *Attorney, Agent, or Firm* — Ryan, Mason & Lewis, LLP

(57) ABSTRACT

At least one processor of a storage system comprises a plurality of cores and is configured to execute a first thread on a first core of the plurality of cores. The first thread polls at least one interface for an indication of data and, responsive to a detection of an indication of data, processes the data. Responsive to the first thread having no remaining data to be processed, the first thread suspends execution on the first core. The at least one processor is further configured to execute a second thread of a second type on a second core of the plurality of cores. The second thread polls the at least one interface for an indication of data to be processed by the first thread. Responsive to a detection of an indication of data, the second thread causes the first thread to resume execution on the first core.

20 Claims, 6 Drawing Sheets

(56) References Cited

U.S. PATENT DOCUMENTS

| | | | |
|---|---|---|---|
| 9,716,754 | B2 | 7/2017 | Swift |
| 2007/0067770 | A1* | 3/2007 | Thomasson ............... G06F 9/52 |
| | | | 718/100 |
| 2008/0279462 | A1 | 11/2008 | Celi, Jr. |
| 2009/0132955 | A1 | 5/2009 | Garg et al. |
| 2010/0162014 | A1* | 6/2010 | Memon ................... G06F 9/485 |
| | | | 713/320 |
| 2010/0179941 | A1 | 7/2010 | Agrawal et al. |
| 2011/0179231 | A1* | 7/2011 | Roush ..................... G06F 3/067 |
| | | | 711/152 |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2017/0192857 | A1 | 7/2017 | Meiri et al. |

OTHER PUBLICATIONS

Zhuravlev, Sergey, et al. "Survey of scheduling techniques for addressing shared resources in multicore processors." ACM Computing Surveys (CSUR) 45.1 (2012): pp. 1-28. (Year: 2012).*

Liu, Jiuxing, and Bulent Abali. "Virtualization polling engine (VPE) using dedicated CPU cores to accelerate I/O virtualization." Proceedings of the 23rd international conference on Supercomputing. 2009. pp. 225-234 (Year: 2009).*

Ungerer, Theo, et al. "Merasa: Multicore execution of hard real-time applications supporting analyzability." IEEE Micro 30.5 (2010): pp. 66-75. (Year: 2010).*

Suleman, M. Aater, et al. "Accelerating critical section execution with asymmetric multi-core architectures." ACM SIGARCH Computer Architecture News 37.1 (2009): pp. 253-264. (Year: 2009).*

Perez, Josep M., Rosa M. Badia, and Jesus Labarta. "A dependency-aware task-based programming environment for multi-core architectures." 2008 IEEE International Conference on Cluster Computing. IEEE, 2008.pp. 142-151 (Year: 2008).*

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

U.S. Appl. No. 16/162,471, filed Oct. 17, 2018 and entitled "Dynamic Multitasking for Distributed Storage Systems."

* cited by examiner

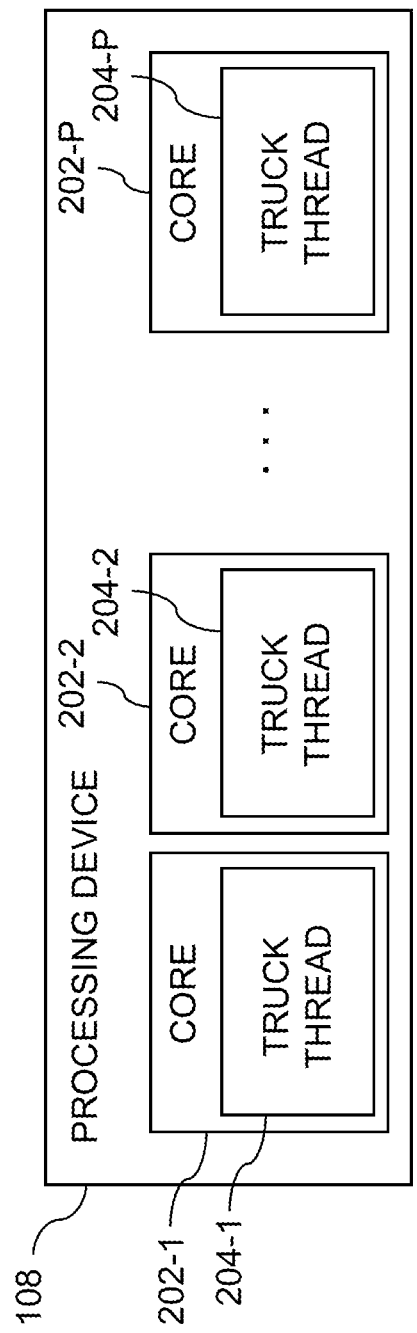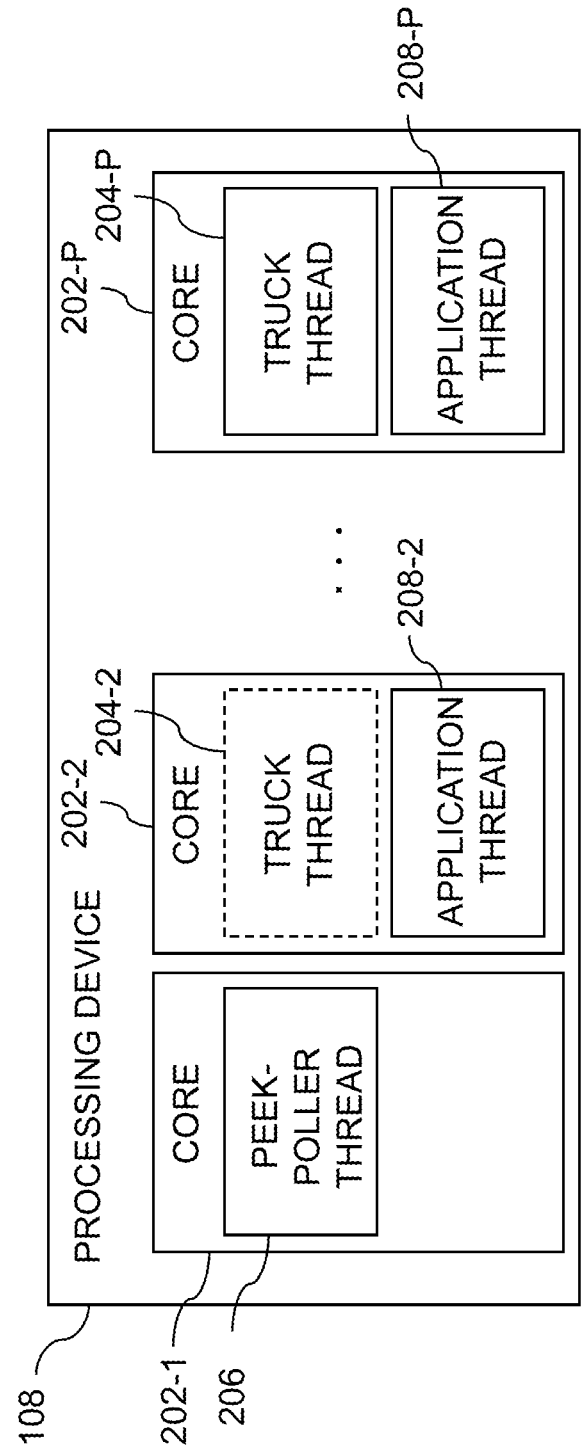

MULTI-CORE PROCESSOR IN STORAGE SYSTEM EXECUTING DEDICATED POLLING THREAD FOR INCREASED CORE AVAILABILITY

FIELD

The field relates generally to information processing systems, and more particularly to storage in information processing systems.

BACKGROUND

Information processing systems utilize a variety of systems for implementing applications at the node level. For example, nodes of a distributed storage system may include multi-core processors that are configured to execute threads associated with applications. One or more cores of a given such multi-core processor may execute the threads associated with a particular application. In some instances, an application may utilize an always-polling model in which threads executing on one or more cores poll interfaces of the information processing system for tasks, events, or other data to be processed. In other instances, an application may use an event driven model in which interrupts are used to activate threads for processing tasks, event or other data using the one or more cores.

SUMMARY

Illustrative embodiments provide techniques for improved processor core control in a storage system.

For example, in one embodiment, a storage system comprises at least one processor and a plurality of storage devices. The at least one processor comprises a plurality of cores and is configured to execute a first thread of a first type on a first core of the plurality of cores. The first thread is configured to poll at least one interface of the storage system for an indication of data to be processed by the first thread. Responsive to a detection of an indication of data on the at least one interface by the polling of the first thread, the first thread is configured to process the data based on the indication. Responsive to the first thread having no remaining data to be processed, the first thread is configured to suspend execution on the first core. The at least one processor is further configured to execute a second thread of a second type on a second core of the plurality of cores. The second thread is configured to poll the at least one interface of the storage system for an indication of data to be processed by the first thread. Responsive to a detection of an indication of data on the at least one interface by the polling of the second thread, the second thread is configured to cause the first thread to resume execution on the first core.

These and other illustrative embodiments include, without limitation, apparatus, systems, methods and processor-readable storage media.

BRIEF DESCRIPTION OF THE DRAWINGS

FIG. 2 is a block diagram of a processing device of the information processing system of FIG. 1 comprising a plurality of cores executing truck thread functionality in an illustrative embodiment.

FIG. 3 is a block diagram of the processing device of FIG. 2 with one core executing peek-poller thread functionality in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
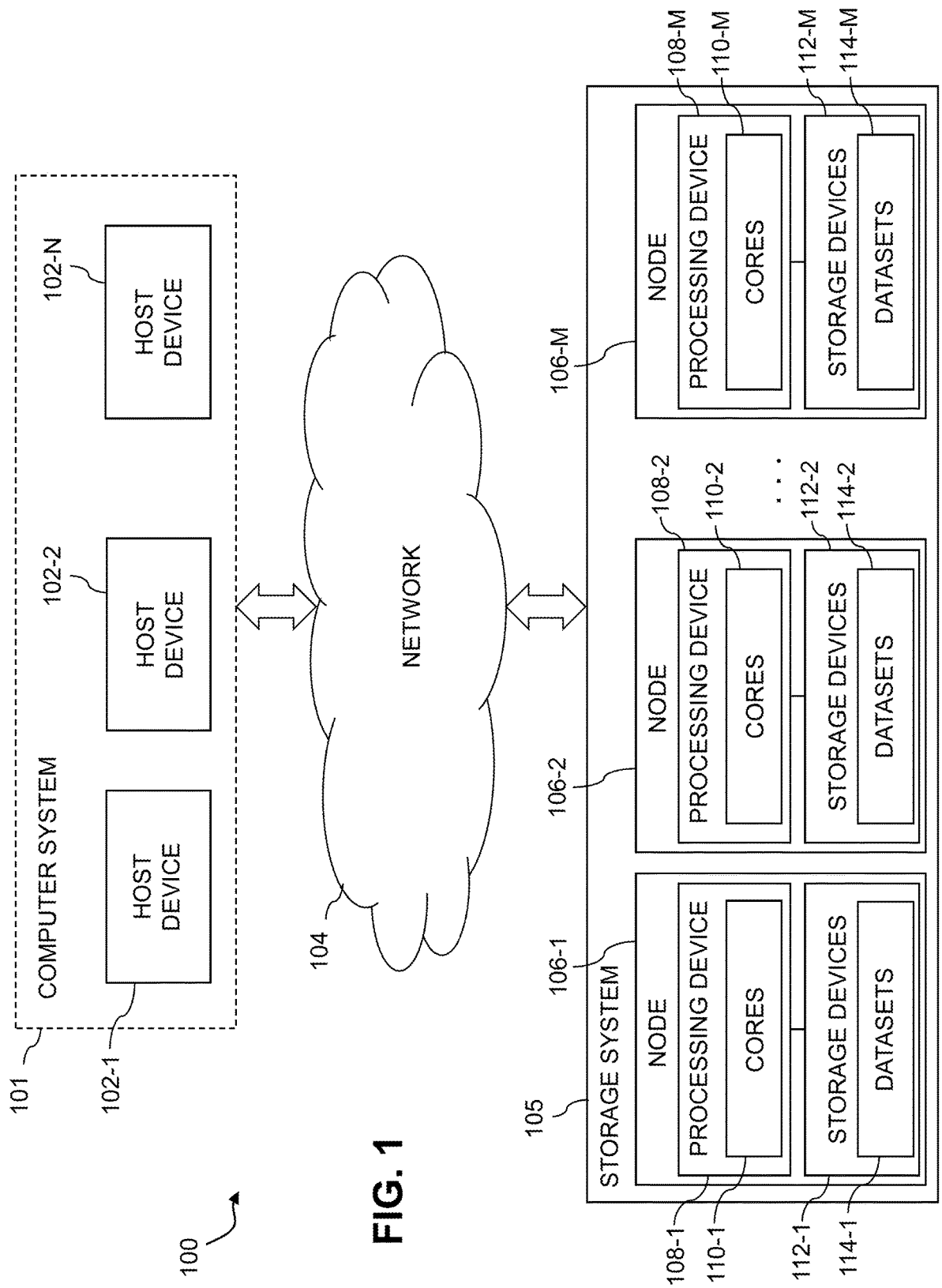
FIG. 1 is a block diagram of an information processing system comprising a storage system configured with peek-poller thread functionality in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of nodes 106-1, 106-2, . . . 106-M, also referred to herein as nodes 106. In some embodiments, for example, the storage system 105 may be a distributed storage system comprising a plurality of nodes 106.

Each node 106 comprises at least one processing device 108-1, 108-2, . . . 108-M, also referred to herein as processing devices 108. For example, a given node 106 may comprise a single processing device 108 or more than one processing device 108. In some embodiments, multiple processing devices 108 of a node 106 may act or function as a single processing device 108.

Processing devices 108-1, 108-2, . . . 108-M comprise respective sets of cores 110-1, 110-2, . . . 110-M, referred to herein as cores 110. For example, a given processing device 108 may comprise a set of two cores, four cores, eight cores, or any other number of cores.

Each node 106-1, 106-2, . . . 106-M also comprises a set of associated storage devices 112-1, 112-2, . . . 112-M, referred to herein as storage devices 112. For example, a given node 106 may comprise one storage device 112, two storage devices 112, four storage devices 112, eight storage devices 112, sixteen storage devices 112, thirty-two storage devices 112 or any other number of storage devices 112. The storage devices 112 store datasets 114-1, 114-2, . . . 114-M, referred to herein as datasets 114, which may comprise logical storage volumes, snapshots or other arrangements of data.

The storage devices 112 illustratively comprise solid state drives (SSDs). Such SSDs are implemented using non-volatile memory (NVM) devices such as flash memory. Other types of NVM devices that can be used to implement at least a portion of the storage devices 112 include non-volatile random-access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage system 105 should also be understood to include additional modules and other components typically found in conventional implementations of storage systems, although such additional modules and other components are omitted from the figure for clarity and simplicity of illustration.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102. In illustrative embodiments storage system 105 may be implemented as a distributed storage system 105 comprising a plurality of nodes 106 that may be logically or physically distributed.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5-7.

It is to be appreciated that these and other features of illustrative embodiments are presented by way of example only and should not be construed as limiting in any way.

Accordingly, different numbers, types and arrangements of system components such as host devices 102, network 104, storage system 105, nodes 106, processing devices 108, cores 110, storage devices 112, and datasets 114 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

In illustrative embodiments, an information processing system 100 may implement applications by executing threads on one or more cores of one or more processors. In an example, a distributed storage system of the information processing system 100 may comprise a plurality of nodes, e.g., nodes 106, that are connected together via a full-mesh network and managed by a system manager. The system manager may, for example, be a controller or other software that executes on a core of the processing device 108 of one or more of nodes 106.

Each node 106 comprises at least one multi-core processing device 108 that implements applications by executing threads. For example, in the case of a block application, which handles the block-based functionality of the storage system, the block application may execute operating system (OS)-threads (described herein in some embodiments as a truck threads or trucks) on one or more cores of the multi-core processing device 108. These truck threads implement the block application functionality. In some embodiments, each truck thread may be hard affixed to a particular core, i.e., may only execute on that particular core.

As part of its operation, each truck thread polls a corresponding set of interfaces of the storage system 105 for tasks, events, or other data to be processed by the truck thread. For example, the set of interfaces may include an interface for receiving indications of completions of submitted IO requests to the disk array, an interface for receiving IO requests from the user, and interfaces for receiving other tasks, events, or other data. Any other interfaces of the storage system 105 may also be polled. Each truck thread, by design, fully utilizes the processor core that it is running on for both interface polling and processing of the corresponding tasks, events, or other data. For example, in illustrative embodiments, each truck thread is designed to fully utilize the processor core that it is running on because, even when there is no actual processing of tasks to be performed, the truck thread continues checking its respective interfaces via polling. This design is optimized for a storage system 105 that requires low latency and high input-output operations per second (TOPS) since no context switches or interrupts are required to perform the processing. In some embodiments, the functionality of the block application may be described as an always-polling model.

In some embodiments, example interfaces that may be polled by a truck thread comprise a front-end interface, a remote procedure call (RPC) messaging interface, a remote direct memory access (RDMA) messaging interface, and a back-end interface. In some embodiments, any other interface commonly used in a storage system 105 may also be polled by the truck thread. In some embodiments, each truck thread defines an IO-provider instance for each corresponding interface that it is responsible for polling.

The front-end interface comprises an interface for receiving (and replying to) IO requests from a user of the storage system, e.g. via a host device 102. For example, a given truck thread may comprise a front-end IO-provider instance that polls for IO requests from a host device 102 or other user.

The RPC messaging interface comprises an interface for sending and receiving messages to and from other nodes. For example, a given truck thread may comprise an RPC messaging IO-provider that polls for messages from other nodes in the system.

The RDMA messaging interface comprises an interface for RDMA transfer of buffers between nodes. For example, a given truck thread may comprise an RDMA messaging IO-provider that polls for the completion of RDMA transfers between nodes.

The back-end interface comprises an interface for accessing the storage devices 112, e.g., to read and write IOs to a disk array. For example, a given truck thread may comprise a back-end IO-provider that polls for the completion of read and write requests initiated by the truck thread to the disk array.

In some cases, the storage system 105 may also implement, at least in part, one or more other applications aside from the block application. For example, a file application that provides a file interface to a user of the information processing system may also be implemented, at least in part, by the storage system 105, for example, by executing a thread on one or more of the cores. In some cases, the block application and the file application, or any other application, may be implemented by the storage system 105 simultaneously, each with a different load that can dynamically change over time.

Since these applications are attempting to utilize the same set of processor cores simultaneously, management of the available processing resource of these cores between the applications may become troublesome. For example, since the block application is implemented by executing truck threads on each processor core of a node 106, and these truck threads can utilize the full capacity of those cores, little to no processing resources may be available for use by threads of another application.

In an example, if only the file application is actively in use, e.g., no tasks, events, or other data are present for the truck threads to process, the associated file threads may only be able to utilize a portion of the processing resources of a core, e.g., 50% or another percentage, where the remaining portion, e.g., the other 50% or another percentage, will be used by the truck threads just for polling interfaces. In cases where the block application is actively performing operations, the truck threads will utilize a substantial portion of the processing resources of the cores, e.g., 90%, 95%, or even 100%, to both poll the interfaces and process any tasks, events, or other data found on those interfaces during the polling which leaves little to no processing resources available on those cores for use by other applications such as a file application.

In illustrative embodiments, the techniques disclosed herein allow the full processing resources of a core to be available for use by other applications even when a truck thread of a block application is utilizing that core to support its functionality.

For example, illustrative embodiments provide a storage system that is able to dynamically adapt to the user operation pattern of multiple simultaneously implemented applications where, for example, one of the applications executes an always-polling model of functionality that consumes significant processing resources, e.g., using the above described truck threads. The disclosed embodiments create an event driven storage system out of the always-polling model through the use of a dedicated peek-poller thread. The dedicated peek-poller thread serves as a mechanism to allow for the sharing of the full resources of a core between the two or more applications in a manner that dynamically matches the user operation pattern. For example, the dedicated peek-poller thread is executed on a single core and partially replaces the polling functionality of each of the truck threads executing on other cores in the processor, thereby freeing up the processing resources of those cores that would otherwise be used by the truck threads for polling for use by other applications during times when the block application is experiencing reduced activity.

With reference now to FIG. 2, a given processing device 108 comprises a set of cores 110 (FIG. 1), e.g., cores 202-1, 202-2, . . . 202-P, referred to herein as cores 202, that execute threads of one or more applications. For example, in some embodiments, a block application is implemented by executing a respective truck thread on one or more of the cores 202 and in some embodiments on each core 202. For example, as illustrated in FIG. 2, a respective truck thread 204-1, 204-2, . . . 204-P may be executed on each core 202 of the given processing device 108 to implement at least a portion of the block application. As described above, by executing a truck thread 204 on a given core 202, a significant portion of the processing resources of that given core 202 is utilized for polling the interfaces associated with that truck thread 204, and processing associated tasks, events or other data found on those interfaces, leaving little to no processing resources available on that core for executing the threads of other applications. In illustrative embodiments, a truck thread 204 is an example of a thread of a first type. The thread of the first type may comprise other types of threads in other embodiments.

With reference now to FIG. 3, illustrative embodiments introduce the use of a peek-poller thread 206 executing on one of the cores 202, e.g., on core 202-1 as illustrated in FIG. 3. For example, the peek-poller thread 206 may be executed on core 202-1 instead of truck thread 204-1 (FIG. 2). In some embodiments, the peek-poller thread 206 may be a modified truck thread 204 or may comprise functionality included in the truck threads 204 that is not normally in use by the truck threads 204. In some embodiments, the peek-poller thread 206 may be executed on any core 202 of the processing device 108. In some embodiments, more than one peek-poller thread 206 may be utilized where, for example, each peek-poller thread 206 may poll a different set of interfaces associated with one or more of the truck threads 204 executing on the other cores of the processing device 108. In illustrative embodiments, a peek-poller thread 204 is an example of a thread of a second type. The thread of the second type may comprise other types of threads in other embodiments.

The peek-poller thread 206 is responsible for polling all of the interfaces associated with each truck thread 204 that is executing on the cores 202 of the given processing device 108. Because the peek-poller thread 206 performs the polling functionality for each truck thread 204, each truck thread 204 no longer needs to perform this polling. For example, instead of polling a respective set of interfaces for tasks, events, or other data, a given truck thread 204 give up execution on its core 202 and wait for the peek-poller thread 206 to detect tasks, events, or other data on that set of interfaces. For example, the given truck thread 204 may give up execution by suspending itself or entering a waiting state in which the given truck thread 204 waits to be woken up by another portion of the processing device 108 such as, e.g., the peek-poller thread 206.

While in the suspended state, the truck thread 204 does not utilize the resources of its core, leaving these resources available for use by another application thread such as, e.g., one of application threads 208-2 through 208-P, referred to herein as application threads 208. In some embodiments, any number of application threads 208 may execute on a given core 202. Application threads 208 may for example, be threads associated with an application such as the file application mentioned above or any other application that utilizes the cores of a node 106 of the storage system 105. For example, as illustrated in FIG. 3, truck thread 204-2 may be in the suspended state on core 202-2, as denoted by the dashed lines, and an application thread 208-2 may execute on core 202-2 and utilize the full processing resources of core 202-2. As another example, truck thread 204-P may be actively executing on core 202-P while an application thread 208-P also attempts to execute on core 202-P where, for example, application thread 208-P may only be able to utilize any processing resources of core 202-P that are currently unused by the truck thread 204-P, e.g., less than 50% of the processing resources or even no processing resources.

When the peek-poller thread 206 detects a task, event or other data on an interface associated with the given truck thread 204, the peek-poller thread 206 wakes up the given truck thread 204. For example, the peek-poller thread 206 may cause the processing device 108 to wake up the given truck thread 204 or resume executing the given truck thread 204 on the core 202. Once awoken, the given truck thread 204 resumes execution of its normal flow of functionality on the core 202, e.g., polling each of its interfaces for tasks, events, or other data, fetching and processing any tasks, events, or other data that are detected, and taking any other actions according to its functionality.

The peek-poller thread 206 has as fast a polling cycle as possible so that it can detect tasks, events, or other data on the interfaces associated with the truck threads 204 as soon as they arrive and wake up the corresponding truck threads 204. For example, in some embodiments, the peek-poller thread 206 may poll for ready tasks, events, or other data in each of the interfaces associated with any truck threads 204 but it does not perform fetching or other similar operations on those ready tasks, events, or other data or otherwise process the ready tasks, events, or other data in a manner that a truck thread 204 would. This allows the peek-poller thread 206 to quickly and efficiently detect tasks, events, or other data on the interfaces without being bogged down by the associated fetching and processing that is performed by the truck threads 204.

After the peek-poller thread 206 wakes up a given truck thread 204, e.g., in response to detecting a task, event or other data on one of the given truck thread 204's corresponding interfaces, the truck thread 204 resumes its normal flow of execution. For example, the given truck thread 204 polls its corresponding interfaces, including the any interfaces on which the peek-poller thread 206 detected a task, event or other data, fetches any tasks, events, or other data that it finds on the interfaces, and processes all of the work corresponding to the fetched tasks, events, or other data.

When all in-flight operations of the given truck thread 204 are in a waiting state, e.g. waiting for an indication of a completion of a pending IO operation from a storage device 112, waiting for an indication of a completion of an RDMA transfer from another node, etc., the given truck thread 204 will release the resources of the core 202 by entering the suspended or sleep state.

In some embodiments, when a truck thread 204 polls its corresponding interfaces and no tasks, events, or other data are present, the truck thread will also release the resources of the core 202 by entering the suspended or sleep state provided that no previously received tasks are currently being processed by the thread. For example, while the truck thread 204 is processing tasks, events, or other data, the truck thread 204 may also be constantly polling for tasks, events, or other data on its interfaces during its normal operational flow. If these interfaces do not contain any tasks, events, or other data, the truck thread 204 may release the resources of the core 202 and enter the suspended or sleep state.

By entering a suspended or sleep state, a given truck thread 204 allows any other application thread that is executing on that core 202 to utilize the released resources for its own execution until the peek-poller thread 206 detects new activity on the corresponding interfaces and wakes up the given truck thread 204 again.

In some embodiments, the given truck thread 204 actively enters the suspended or sleep state, for example, by executing a yield command. In some embodiments, processing device 108 may determine that the given truck thread 204 has no more processing to be performed and may cause the given truck thread 204 to enter the suspended or sleep state. For example, as described herein, a given truck thread 204 suspending the execution on a core 202 comprises the given truck thread 204 actively entering the suspended state on its own, e.g., by calling a yield command, or alternatively, the processing device 108 or another portion of the node 106 issuing a command to the given truck thread 204 to suspend execution.

By utilizing the above described peek-poller thread functionality and associated suspension of the truck threads 204, the life cycle of a given truck thread 204 becomes a combination of an event driven model (via the peek-poller thread) and a polling model because after the truck thread 204 is woken up by the peek-poller thread 206 in response to the detection of a task, event or other data on a corresponding interface, it resumes its normal operation of polling until it releases the core again.

In some embodiments, the operating system (OS) of the processing device 108 is configured to never preempt a truck thread 204 executing on one of its cores 202 in favor of another application thread 208 such that the truck thread 204 will continue to run until it voluntarily yields the core 202, e.g., by voluntarily entering a suspended or waiting state, even if another application thread 208 is ready to execute on that core 202. In contrast, while the operating system will not preempt an executing truck thread 204 for another application thread 208, when a suspended truck thread 204 becomes ready to run in response to the peek-poller thread 206 waking it up, the operating system in such embodiments may be configured to preempt any other application threads 208 executing on the core 202 and schedule the ready truck thread 204 for immediate execution.

In order to ensure such requirements in these embodiments, the operating system scheduling policy for the block application is configured with a priority higher than the priority of the other applications. This configuration guarantees that the operating system will always let a ready truck thread 204 run until it voluntarily releases the core 202.

The above described peek-poller thread functionality allows the block application to utilize the cores 202 of a processing device 108 in correlation to the user pattern, rather than constantly consuming a substantial portion of the resources of the cores 202 and in some cases a full 100% utilization of the cores 202 by performing uninterrupted polling. This in turn allows other applications to execute application threads 208 that utilize the remaining core cycles that are not used by the block application when the truck threads 204 are suspended. It is important to note that while the processing resources of cores having truck threads 204 are freed up while those truck threads 204 are suspended, one core is fully dedicated to executing the peek-poller thread 206 and therefore will not be available for use by the truck threads 204 or the other application threads 208 being executed by the processing device 108.

For example, when only one application is used, e.g., either the block application or another application such as a file application, the processing device 108 will be able to utilize up to P–1 cores 202. If the block application consumes 20% of each core 202, the other application will be able to utilize the remaining 80% of each core 202, except for the core 202 that is executing the peek-poller thread 206.

The pseudocode below provides an example of how the peek-poller thread functionality may be implemented:

```
While (TRUE) {
    For each Normal TRUCK truck_i {
        Result = Peek_Front_End_interface(truck_i)
        If (Result == TRUE)
            Wake_Up(truck_i)
        Result = Peek_RPC_Messaging_interface(truck_i)
        If (Result == TRUE)
            Wake_Up(truck_i)
        Result = Peek_RDMA_Messaging_interface(truck_i)
        If (Result == TRUE)
            Wake_Up(truck_i)
        Result = Peek_Back_End_interface(truck_i)
        If (Result == TRUE)
            Wake_Up(truck_i)
    }
}
```

As can be seen from the example pseudocode above, the peek-poller thread 206 may poll the interfaces associated with each truck thread 204 executing on the cores 202 of the processing device 108 and if any tasks, events, or other data are found on the interfaces, will wake up the respective truck thread 204 from its suspended state. As shown in this example, the peek-poller thread 206 in this embodiment does not fetch the detected tasks, events, or other data for further processing, leaving that fetching and processing to the corresponding truck thread 204.

The pseudocode below provides an example of how the truck thread functionality may be implemented:

```
While (TRUE) {
    /* poll all interfaces and create corresponding tasks */
    Poll_And_Fetch_Front_End_Available_Requests ( )
    Poll_And_Fetch_RPC_Messaging_Events ( )
    Poll_And_Fetch_RDMA_Messaging_Events ( )
    Poll_And_Fetch_Back_End_Completions ( )
    While (has ready tasks) {
        Process ready tasks
    }
    /* reaching here when no tasks at all or all in-flight tasks are waiting.
    * call Yield( ) to voluntarily release the core until the peek-poller thread wakes the
    truck thread.
    */
    Yield( )
    /* reaching here after the peek-poller thread detected events in the truck thread
interfaces*/
}
```

As can be seen from the above example pseudocode, in an illustrative embodiment, the truck thread 204 polls each interface and fetches any corresponding tasks, events, or other data, processes any tasks, events, or other data that are ready for processing, and then performs a yield command to release the core 202 until the peek-poller thread 206 wakes up the truck thread 204. In the case where no tasks, events, or other data are available to be fetched and processed, the truck thread 204 may also perform the yield command after the polling is complete.

The operation of the information processing system 100 will now be described in further detail with reference to the flow diagram of the illustrative embodiment of FIG. 4. The process as shown in of FIG. 4 includes steps 400 through 418 and is suitable for use in system 100 but is more generally applicable to other types of information processing systems in which a storage system is configured to implement the functionality of the peek-poller thread 206 and truck threads 204. The steps are illustratively performed at least in part under the control of the processing device 108 of a node 106 in storage system 105 of system 100. Some or all of the steps may be performed asynchronously where, for example, steps 400 through 410 may be performed by a different thread than the thread that performs steps 412 through 418 and may be performed concurrently with or at any other time relative to the performance of steps 412 through 418. Any other step may also or alternatively be performed asynchronously.

At 400, processing device 108 executes a given truck thread 204, e.g., truck thread 204-2 on a first core 202, e.g., core 202-2. For example, processing device 108 implements a block application comprising truck threads 204 that are executed on the cores 202 of the processing device 108.

At 402, the given truck thread 204 polls its corresponding interfaces for tasks, events, or other data to be processed by the given truck thread 204.

At 404, the given truck thread 204 fetches and processes any tasks, events, or other data found on the corresponding interfaces during the polling and proceeds to step 406. Even if no tasks, events, or other data are found on the corresponding interfaces to be fetched and processed, the method proceeds to step 406.

At 406, the given truck thread 204 determines whether or not there are any remaining tasks, events, or other data to be processed. For example, if the given truck thread 204 is still processing one or more of the tasks, events, or other data fetched from the corresponding interfaces, the given truck thread 204 may determine that there are remaining tasks, events, or other data to be processed and proceed to step 408.

At step 408, the given truck thread 204 continues processing any remaining tasks. In conjunction with processing the remaining tasks, the given truck thread 204 also continues determining whether or not there are any remaining tasks, events, or other data to be processed at 406.

Returning now to step 406, if there are no tasks, events, or other data remaining to be processed by the given truck thread 204 the method may proceed to step 410. For example, if the given truck thread 204 has no more processing left to do but is waiting for a reply or other indication from one or more of the corresponding interfaces before performing a further action, the given truck thread may determine that there are no tasks, events, or other data remaining to be processed.

At 410, the given truck thread 204 suspends execution on the first core and enters a suspended or waiting state. For example, the given truck thread 204 may call a yield command, giving up execution on the first core. In another example, a portion of processing device 108 may command the given truck thread 204 to give up execution.

While the given truck thread 204 is executing steps 400 through 410 or is in the suspended or waiting state, a peek-poller thread 206 is also executed on a second core 202 of the processing device 108, e.g., core 202-1, at 412. For example, the peek-poller thread 206 may be executed in parallel or asynchronously with the execution of the truck thread 204.

At 414, the peek-poller thread 206 polls the interfaces corresponding to any truck threads 204 executing on the cores 202 of the processing device 108 including, for example, the given truck thread 204 executing on the first core 202.

At 416, the peek-poller thread 206 determines whether or not there are any tasks, events, or other data on the interfaces corresponding to the respective truck threads 204 that need to be processed. If tasks, events, or other data are detected on the interfaces, the method proceeds to step 418. If no tasks, events, or other data are detected, the method returns to step 414 and the peek-poller thread 206 continues polling the interfaces of each of the truck threads 204 executing on the cores 202 of the processing device 108.

At 418, the peek-poller thread 206 wakes up the truck thread 204 that has tasks, events, or other data on its corresponding interfaces, e.g., the given truck thread 204 in this example. The given truck thread 204 then executes steps 400 through 410 until it once again suspends execution, as described above. At 418, the method also returns to step 414 and continues polling the interfaces of each of the truck threads 204 executing on the cores 202 of the processing device 108.

In some embodiments, the peek-poller thread functionality described above can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

Figure 4:
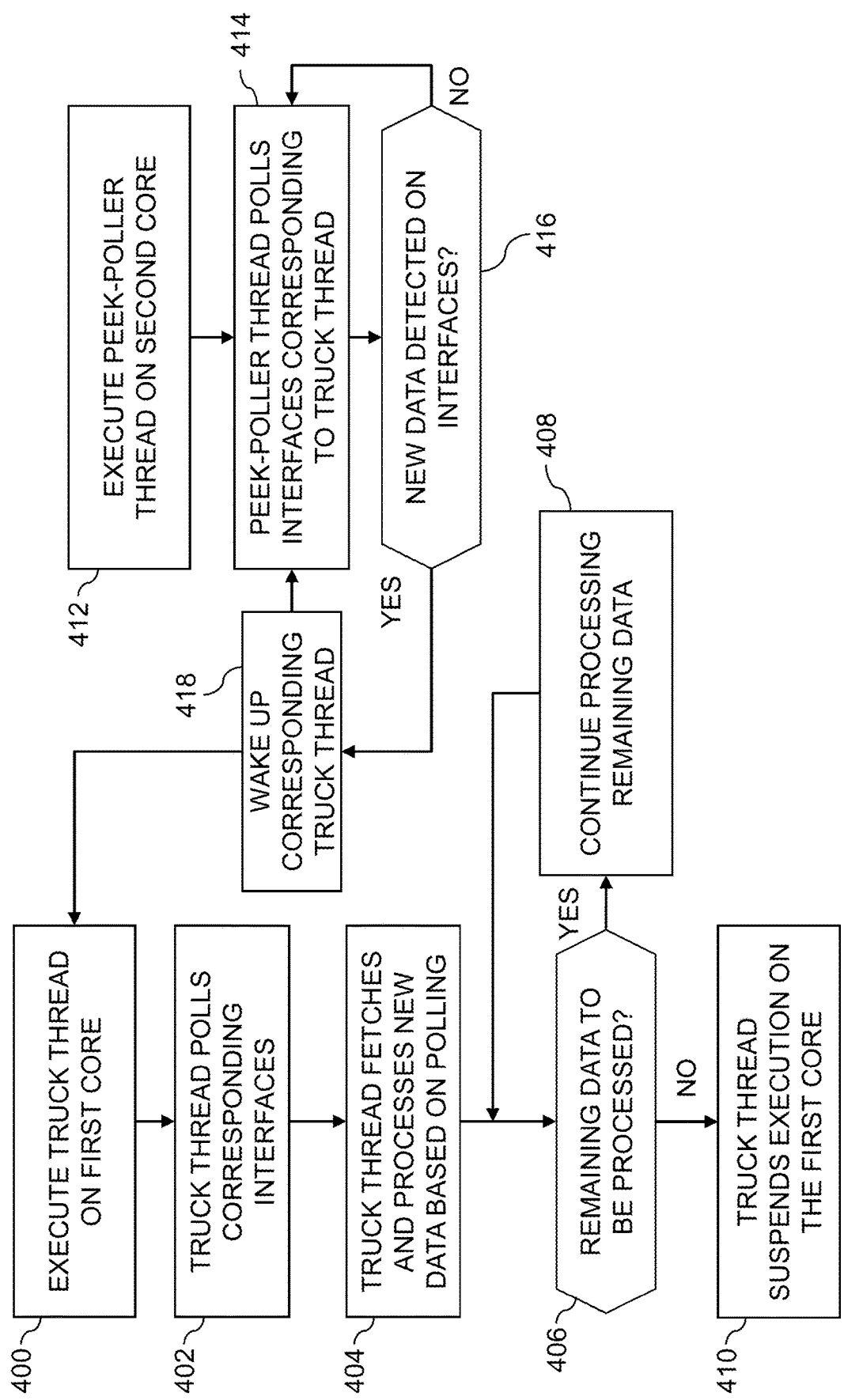
FIG. 4 is a flow diagram of an example process of the peek-poller thread functionality and truck thread functionality in an illustrative embodiment.

Functionality such as that described in conjunction with the flow diagram of FIG. 4 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as a processing device 108 of storage system 105 that is configured to control performance of one or more steps of the FIG. 4 process in its corresponding system 100 can be implemented as part of what is more generally referred to herein as a processing platform comprising one or more processing devices each comprising a processor coupled to a memory. A given such storage controller may correspond to one or more virtual machines or other types of virtualization infrastructure such as Docker containers or Linux containers (LXCs). The storage controller, as well as other system components, may be implemented at least in part using processing devices 108 of such processing platforms. For example, in a distributed implementation, respective distributed modules of such a storage system 105 can be implemented in respective containers running on respective ones of the processing devices of a processing platform.

In some embodiments, the storage system comprises an XtremIO™ storage array or other type of content addressable storage system suitably modified to incorporate the peek-poller thread functionality as disclosed herein.

An illustrative embodiment of such a content addressable storage system will now be described with reference to FIG. 5. In this embodiment, a content addressable storage system 505 comprises a plurality of storage devices 506 and an associated storage controller 508. The content addressable storage system 505 may be viewed as a particular implementation of the storage system 105, and accordingly is assumed to be coupled to host devices 102 of computer system 101 via network 104 within information processing system 100.

The storage controller 508 in the present embodiment is configured to implement peek-poller thread functionality of the type previously described in conjunction with FIGS. 1-4.

The storage controller 508 includes one or more processing devices each comprising a plurality of cores, which are configured to operate in a manner similar to that described above for implementing peek-poller thread functionality by processing devices 108.

Figure 5:
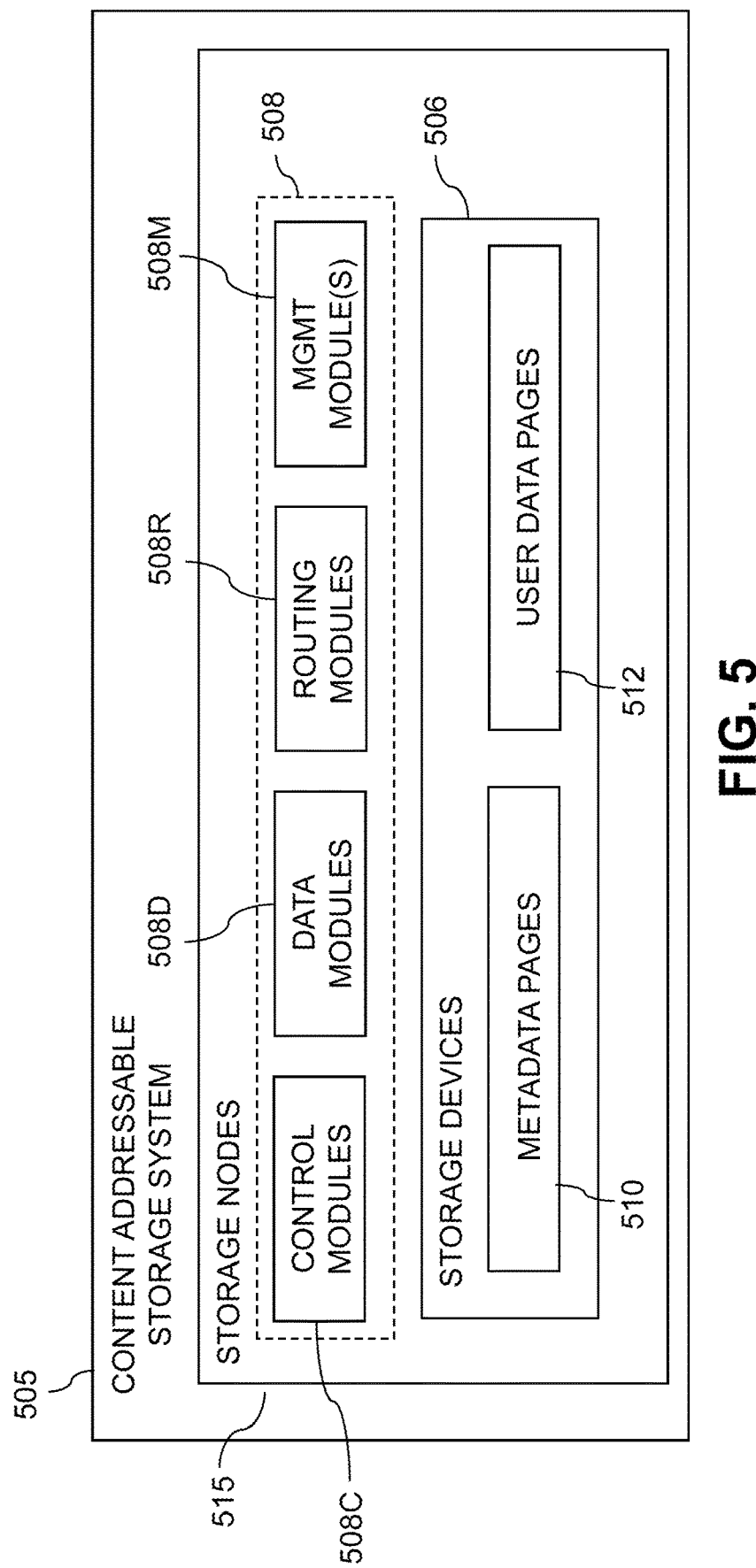
FIG. 5 shows a content addressable storage system having a distributed storage controller configured for implementing the peek-poller thread functionality and truck thread functionality in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled to network 104. Alternatively, such additional storage nodes may be part of another clustered storage system of the system 100. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

The storage devices 506 are configured to store metadata pages 510 and user data pages 512 and may also store additional information not explicitly shown such as checkpoints and write journals. The metadata pages 510 and the user data pages 512 are illustratively stored in respective designated metadata and user data areas of the storage devices 506. Accordingly, metadata pages 510 and user data pages 512 may be viewed as corresponding to respective designated metadata and user data areas of the storage devices 506.

A given "page" as the term is broadly used herein should not be viewed as being limited to any particular range of fixed sizes. In some embodiments, a page size of 8-KB is used, but this is by way of example only and can be varied in other embodiments. For example, page sizes of 4-KB, 16-KB or other values can be used. Accordingly, illustrative embodiments can utilize any of a wide variety of alternative paging arrangements for organizing the metadata pages 510 and the user data pages 512.

The user data pages 512 are part of a plurality of logical unit numbers (LUNs) configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 512 can include any type of user data that may be utilized in the system 100. The term "user data" herein is therefore also intended to be broadly construed.

The content addressable storage system 505 in the embodiment of FIG. 5 is configured to generate hash metadata providing a mapping between content-based digests of respective ones of the user data pages 512 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 512. The hash metadata generated by the content addressable storage system 505 is illustratively stored as metadata pages 510 in the metadata area. The generation and storage of the hash metadata is assumed to be performed under the control of the storage controller 508.

Each of the metadata pages 510 characterizes a plurality of the user data pages 512. For example, a given set of user data pages representing a portion of the user data pages 512 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 510 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 510 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

In some embodiments, the content addressable storage system 505 comprises an XtremIO™ storage array suitably modified to incorporate the above described peek-poller thread functionality.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, peek-poller thread functionality in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8-KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein in their entirety.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8-KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device, illustratively one of the host devices 102. In some embodiments, a write request is received in the distributed storage controller 508 of the storage system 505 and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement peek-poller thread functionality in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with peek-poller thread functionality will now be described in greater detail with reference to FIGS. 6 and 7. Although described in the context of system 100, these platforms may also be used to implement at least portions of other information processing systems in other embodiments.

Figure 6:
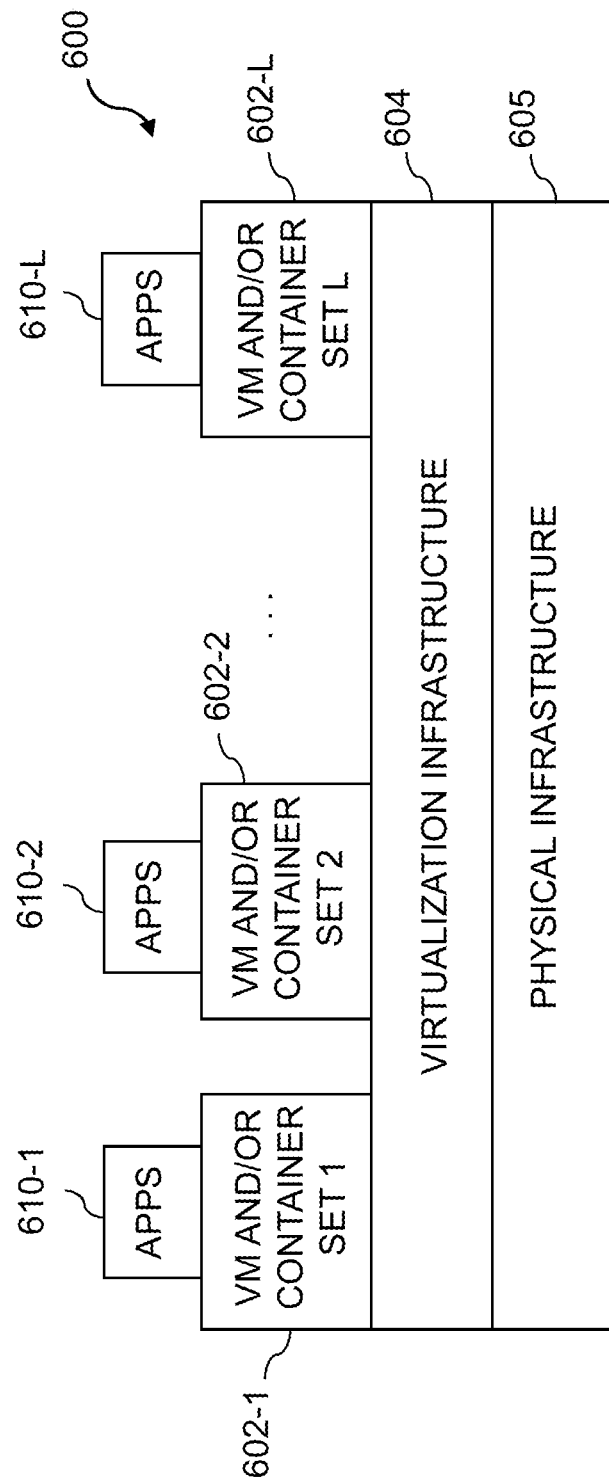
FIGS. 6 and 7 show examples of processing platforms that may be utilized to implement at least a portion of an information processing system in illustrative embodiments.
Figure 7:
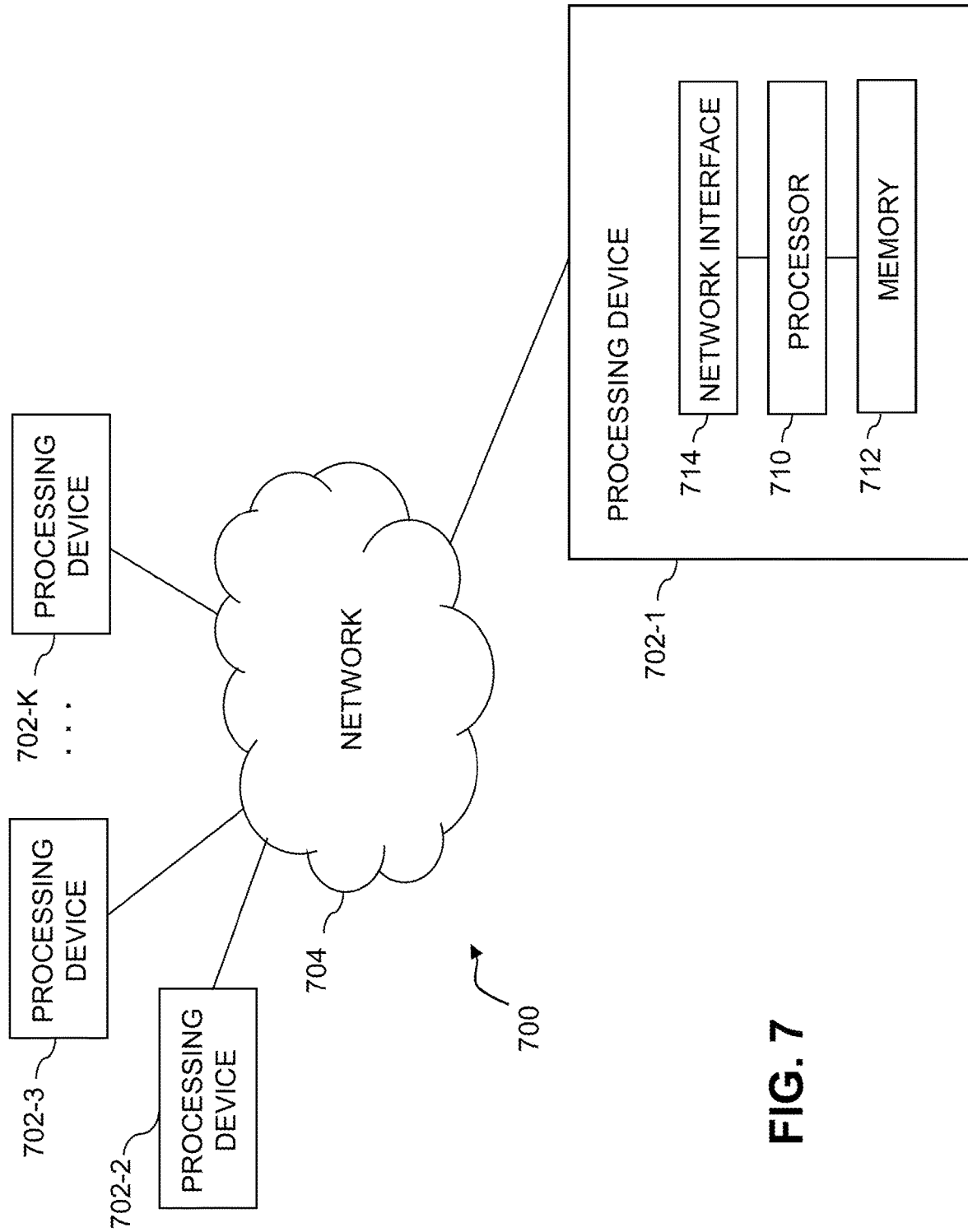

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide peek-poller thread functionality of the type described above for one or more processes running on a given one of the VMs. For example, each of the VMs can implement peek-poller thread functionality for providing enhanced core utilization in the system 100.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide peek-poller thread functionality of the type described above. For example, a container host device supporting multiple containers of one or more container sets can implement one or more cores executing the peek-poller thread functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the peek-poller thread functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, peek-poller thread functionality and associated truck thread functionality. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a node and a plurality of storage devices, the node comprising at least one processor coupled to memory and at least one interface, the at least one processor of the node comprising a plurality of cores, the at least one processor configured:
to execute a first thread of a first type on a first core of the plurality of cores to implement at least a portion of an application of the storage system, the first thread comprising an operating system thread, the first thread being configured:
to poll the at least one interface of the node or an indication of data to be processed by the first thread;
responsive to a detection of an indication of data on the at least one interface by the polling of the first thread, to process the data based on the indication; and
responsive to the first thread having no remaining data to be processed, to suspend execution on the first core; and
to execute a second thread of a second type on a second core of the plurality of cores to implement at least a portion of the application of the storage system, the second thread comprising an operating system thread, the second thread being configured to at least partially replace a polling functionality of the first thread by polling the at least one interface of the node for an indication of data to be processed by the first thread and, responsive to a detection of an indication of data on the at least one interface by the polling of the second thread, causing the first thread to resume execution on the first core.

2. The apparatus of claim 1, wherein the at least one processor is configured to implement a first application by executing at least the first thread of the first type on the first core.

3. The apparatus of claim 2, wherein the at least one processor is further configured to implement a second application by executing at least a third thread of a third type on the first core while the execution of the first thread on the first core is suspended.

4. The apparatus of claim 3, wherein threads of the first type have a higher priority than threads of the third type such that, in response to the first thread resuming execution on the first core, the at least one processor is configured to suspend execution of the third thread on the first core.

5. The apparatus of claim 1, wherein the at least one interface comprises one or more of:
an interface that is configured to receive and reply to input-output requests from a user of the storage system;
an interface that is configured to send messages to and receive messages from other nodes of the storage system;
an interface that is configured for remote direct memory access (RDMA) transferring of buffers to and from other nodes of the storage system; and
an interface that is configured for communicating input-output operations to the plurality of storage devices.

6. The apparatus of claim 1, wherein the first thread is configured to determine whether or not another thread is ready to be executed on the first core prior to suspending execution on the first core in response to the first thread having no remaining data to be processed,
wherein the first thread is configured to suspend execution on the first core in response to the first thread determining that another thread is ready to be executed on the first core and that the first thread has no remaining data to be processed, and
wherein the first thread is configured to not suspend execution on the first core in response to the first thread determining that no other thread is ready to be executed on the first core and that the first thread has no remaining data to be processed.

7. The apparatus of claim 1, wherein the first thread of the first type comprises a truck thread and wherein the second thread of the second type comprises a peek-poller thread.

8. A method comprising:
executing a first thread of a first type on a first core of a plurality of cores of at least one processing device of a node of a storage system to implement at least a portion of an application of the storage system, the first thread comprising an operating system thread, the at least one processing device comprising a processor coupled to memory, the node comprising at least one interface, the first thread being configured:
to poll the at least one interface of the node for an indication of data to be processed by the first thread;
responsive to a detection of an indication of data on the at least one interface by the polling of the first thread, to process the data based on the indication; and
responsive to the first thread having no remaining data to be processed, to suspend execution on the first core; and
executing a second thread of a second type on a second core of the plurality of cores to implement at least a portion of the application of the storage system, the second thread comprising an operating system thread, the second thread being configured to at least partially replace a polling functionality of the first thread by polling the at least one interface of the node for an indication of data to be processed by the first thread and, responsive to a detection of an indication of data on the at least one interface by the polling of the second thread, causing the first thread to resume execution on the first core.

9. The method of claim 8, wherein the method implements a first application by executing at least the first thread of the first type on the first core.

10. The method of claim 9, wherein the method implements a second application by executing at least a third thread of a third type on the first core while the execution of the first thread on the first core is suspended.

11. The method of claim 10, wherein threads of the first type have a higher priority than threads of the third type, the method further comprising suspending execution of the third thread on the first core in response to the first thread resuming execution on the first core.

12. The method of claim 8, wherein the at least one interface comprises one or more of:
an interface that is configured to receive and reply to input-output requests from a user of the storage system;
an interface that is configured to send messages to and receive messages from other nodes of the storage system;
an interface that is configured for remote direct memory access (RDMA) transferring of buffers to and from other nodes of the storage system; and
an interface that is configured for communicating input-output operations to the plurality of storage devices.

13. The method of claim 8, wherein the first thread is configured to determine whether or not another thread is ready to be executed on the first core prior to suspending the execution of the first thread on the first core in response to the first thread having no remaining data to be processed,
wherein the first thread is configured to suspend execution on the first core in response to the first thread determining that another thread is ready to be executed on the first core and that the first thread has no remaining data to be processed, and
wherein the first thread is configured to not suspend execution on the first core in response to the first thread determining that no other thread is ready to be executed on the first core and that the first thread has no remaining data to be processed.

14. The method of claim 13, wherein the first thread of the first type comprises a truck thread and wherein the second thread of the second type comprises a peek-poller thread.

15. A computer program product comprising a non-transitory processor-readable storage medium having stored therein program code of one or more software programs, wherein the program code when executed by at least one processing device of a node of a storage system, the at least one processing device comprising at least one processor coupled to memory, the at least one processor comprising a plurality of cores, the node comprising at least one interface, causes the at least one processing device:
to execute a first thread of a first type on a first core of the plurality of cores to implement at least a portion of an application of the storage system, the first thread comprising an operating system thread, the first thread being configured:
to poll the at least one interface of the node for an indication of data to be processed by the first thread;
responsive to a detection of an indication of data on the at least one interface by the polling of the first thread, to process the data based on the indication; and
responsive to the first thread having no remaining data to be processed, to suspend execution on the first core; and
to execute a second thread of a second type on a second core of the plurality of cores to implement at least a portion of the application of the storage system, the second thread comprising an operating system thread, the second thread being configured to at least partially replace a polling functionality of the first thread by polling the at least one interface of the node for an indication of data to be processed by the first thread and, responsive to a detection of an indication of data on the at least one interface by the polling of the second thread, causing the first thread to resume execution on the first core.

16. The computer program product of claim 15, wherein the at least one processing device is configured to implement a first application by executing at least the first thread of the first type on the first core.

17. The computer program product of claim 16, wherein the at least one processing device is further configured to implement a second application by executing at least a third thread of a third type on the first core while the execution of the first thread on the first core is suspended.

18. The computer program product of claim 17, wherein threads of the first type have a higher priority than threads of the third type such that, in response to the first thread resuming execution on the first core, the at least one processing device is configured to suspend execution of the third thread on the first core.

19. The computer program product of claim 15, wherein the at least one interface comprises one or more of:
an interface that is configured to receive and reply to input-output requests from a user of the storage system;
an interface that is configured to send messages to and receive messages from other nodes of the storage system;
an interface that is configured for remote direct memory access (RDMA) transferring of buffers to and from other nodes of the storage system; and
an interface that is configured for communicating input-output operations to the plurality of storage devices.

20. The computer program product of claim 15, wherein the first thread is configured to determine whether or not another thread is ready to be executed on the first core prior to suspending the execution on the first core in response to the first thread having no remaining data to be processed, wherein the first thread is configured to suspend execution on the first core in response to the first thread determining that another thread is ready to be executed on the first core and that the first thread has no remaining data to be processed, and wherein the first thread is configured to not suspend execution on the first core in response to the first thread determining that no other thread is ready to be executed on the first core and that the first thread has no remaining data to be processed.

* * * * *